J. J. HUGHES.
MOTION PICTURE SHUTTER.
APPLICATION FILED MAY 26, 1916.
1,209,584.    Patented Dec. 19, 1916.
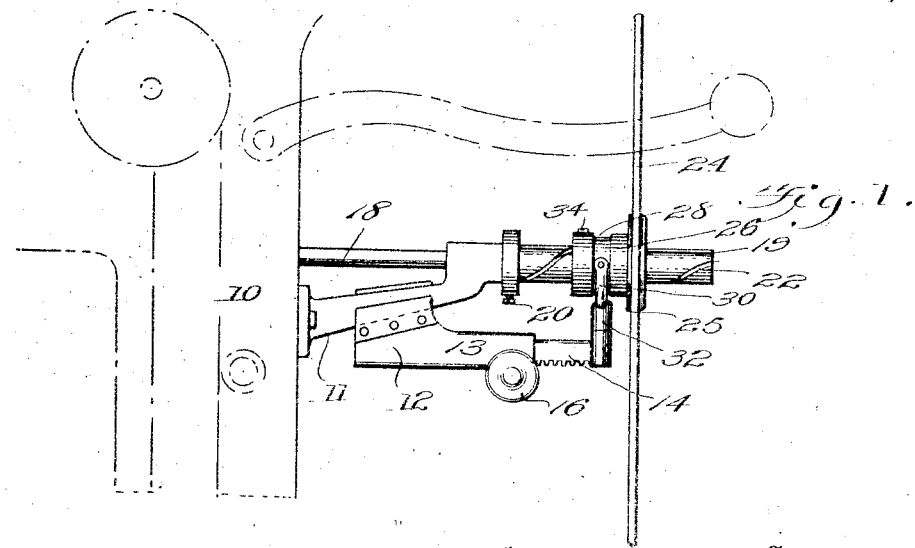
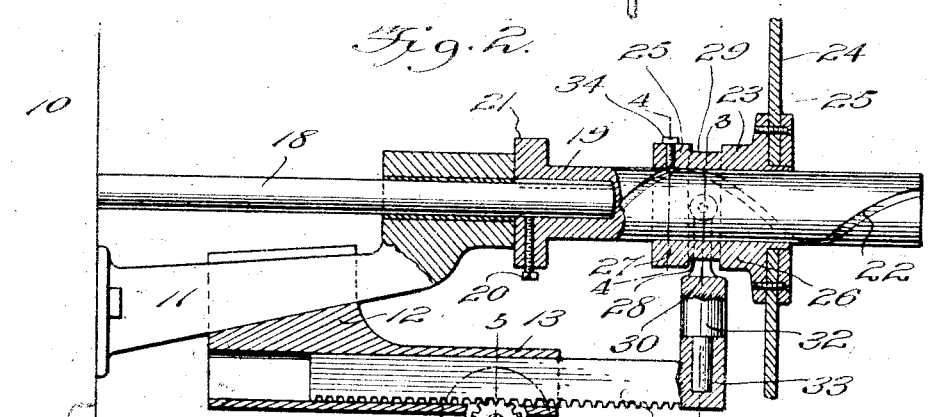
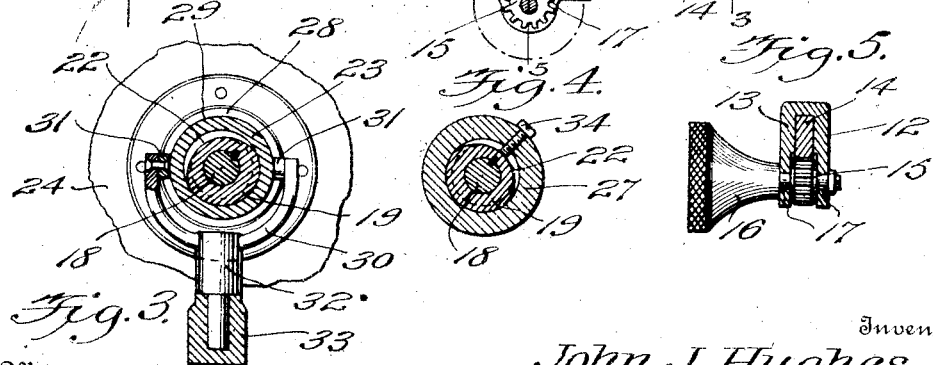
Inventor
John J. Hughes
By Victor J. Evans
Attorney
Witness

UNITED STATES PATENT OFFICE.

JOHN J. HUGHES, OF PHILADELPHIA, PENNSYLVANIA.

MOTION-PICTURE SHUTTER.

1,209,534.

Specification of Letters Patent.

Patented Dec. 19, 1916.

Application filed May 26, 1916. Serial No. 100,073.

*To all whom it may concern:*

Be it known that I, JOHN J. HUGHES, a citizen of the United States, residing at Philadelphia, in the county of Philadelphia and State of Pennsylvania, have invented new and useful Improvements in Motion-Picture Shutters, of which the following is a specification.

The invention relates to motion picture apparatus and more particularly to the shutters thereof, and has for an object to provide a shutter mechanism for adjusting the shutter.

Among other features the invention comprehends suitable mechanism which may be constructed to form a part of a new machine or attached to a machine of any standard make, the mechanism providing for an adjustment of the shutter of the motion picture machine whether the machine be in operation or not. To this end use is made of a manually operable element communicating with a suitable yoke disposed to engage and actuate a coupling or shutter supporting part arranged to slide upon a sleeve capable of being rotated with the usual shutter operating shaft, with means for causing the shutter supporting element or part to be rotated upon the sleeve in a clockwise or counter-clockwise direction as the part is advanced or retreated upon the sleeve. This operation is possible when the sleeve is being rotated by the rotation of the shutter driving shaft or when it is stationary.

It is well known that in the operation of motion picture apparatus the shutter with the usual aperture or apertures therein must be adjusted upon the shutter driving shaft to synchronize with the motion picture operating mechanism so that the opaque part of the shutter will be in proper relation to the projecting lens and framing device while the film is being advanced to remove one of the pictures thereof from exhibiting position and bring another of the pictures thereof into exhibiting position. If this were not the case the portion of the film between the pictures would be exhibited upon the screen while one picture is being moved out of exhibiting position and another brought into view, the result being what is generally known in the motion picture industry as "travel ghost." Further the majority of machines now generally used for exhibiting motion pictures do not provide for an adjustment of the shutter to effect the desired result while the machine is in operation and the operator, in the event that the shutter is not in proper relation to the mechanism of the machine, must stop the machine, and loosen the shutter from the shutter driving shaft and adjust it as he thinks it should be. This adjustment cannot always be determined in an instant and is ofttimes a matter of guess work until the proper adjustment is obtained.

With my device the shutter of the motion picture machine can be adjusted to operate in synchronism with the motion picture mechanism while the machine is in operation and even when the machine is stationary the adjustment of the shutter can be obtained much more quickly and accurately than by the usual method now generally employed.

In the further disclosure of the invention reference is to be had to the accompanying drawings, constituting the part of this specification, in which similar characters of reference denote corresponding parts in all the views, and in which—

Figure 1— is a fragmentary side elevation of a motion picture machine showing my device applied thereto. Fig. 2— is a vertical, longitudinal, sectional view taken through the structure as shown in Fig. 1. Fig. 3— is a vertical, transverse, sectional view taken on the line 3—3 in Fig. 2. Fig. 4— is a vertical, transverse, sectional view taken on the line 4—4 in Fig. 2. Fig. 5— is a vertical, transverse, sectional view taken on the line 5—5 in Fig. 2.

Referring more particularly to the views, the motion picture machine is generally indicated by the numeral 10 and applied thereto is a bracket 11 which may, if desired, form an integral part of the framework of the machine. Connected to the bracket 11 is a secondary or auxiliary bracket 12 which is formed with a tubular portion 13 in which is arranged to slide a rack-bar 14, the teeth of which mesh with a pinion 15 keyed to a shaft 16, mounted in suitable bearings 17 on the auxiliary bracket 12 so that when the shaft is actuated the rack-bar will be advanced or retreated.

Journaled on the bracket 11 and extending into the motion picture machine to form a part thereof, is the usual shutter driving shaft 18, the said shaft projecting forwardly beyond the bracket 11 and into a sleeve 19 keyed or otherwise secured rigidly to the projecting end of the shaft 18 by a set screw 20 passing through an enlarged circular flange 21 at one end of the sleeve. The sleeve is formed with a spiral groove 22 as shown, and mounted to slide loosely upon the sleeve is a shutter supporting plate 23 for the usual shutter 24, said plate 23 being preferably formed integral with a coupling 25, and consisting substantially of an enlarged circular flange 26 spaced from an enlarged circular flange 27, thus providing a space 28 and a circular surface 29, the space receiving therein the arms of a yoke 30, having knobs 31 operating over the surface 29, the arms of the yoke terminating in a stem 32 mounted to rotate in a head 33 at the forward end of the rack 14. A set screw 34 passes through the flange 27 of the shutter supporting element and extends into the spiral groove 22 in the tubular sleeve 19 as shown for the purpose of imparting the desired movement to the shutter supporting element as will be more clearly brought out hereinafter.

Now assuming that the shutter driving shaft 18 is in motion and the shutter rotating at the usual high rate of speed when the machine is in operation, it will be clearly seen that if the shutter is not disposed in proper relation to the mechanism of the machine in order to prevent "travel ghost," it is only necessary for the operator to turn the shaft 16 thus advancing or retreating the rack 14 and in turn through the medium of the yoke, advancing or retreating the shutter supporting element on the tubular sleeve 19. The movement of the shutter supporting element on the sleeve, aside from being a backward or a forward one, as the case may be, is also of a rotary one due to the projection of the screw 34 into the spiral groove 22 of the tubular sleeve 19 so that the mentioned forward or backward movement of the shutter supporting element will cause the same to turn upon the tubular sleeve and thus the operation of the shutter can be brought into proper relation with the projecting lens of the machine and the shutter will operate in synchronism with the mechanism, without however impairing the rotary movement of the shutter driving shaft 18 or the tubular sleeve 19, rigid on the shaft 18 by reason of the set screw 20.
This adjustment of the shutter, it will be understood, can also be effected when the machine is not in operation but it will be clear that the adjustment of the shutter while the machine is in operation insures a much more successful adjustment of the shutter with respect to the mechanism of the machine in that the operator, actuating the shaft 16 and at the same time carefully noting the exhibition on the screen, can readily discern where the trouble lies and thus adjust the shutter proportionately to effect the desired result and secure the shutter in proper operating relation to the motion picture apparatus.

The invention described is simple in its construction; consists of few parts that can be readily assembled and will not easily get out of order, and, as mentioned heretofore, the invention can be constructed as an attachment for a previously completed machine or, if desirable, built with the machine to form a unitary part thereof.

It will be understood that I do not limit myself to the particular disclosure in the views or the particular description of the device; that various slight changes may be made without departing from the spirit of the invention, the scope of which is defined in the appended claims.

Having described my invention I claim:

1. A motion picture shutter and operating device for motion picture machines, including a shutter driving shaft, and a sleeve, said sleeve having a spiral groove, a shutter carrying element extending into the spiral groove, a movable rack, means for operating said rack and a yoke pivoted upon said rack and connected with the shutter supporting element to actuate the same forwardly or backwardly upon the sleeve and simultaneously rotate the element, when the rack is actuated.

2. A motion picture shutter and operating device for a motion picture machine, including a shutter driving shaft provided with a spiral groove, comprising a shutter carrying element rotated by the shaft when the latter is rotated, a movable rack, means for actuating said rack, a yoke pivoted on said rack and connected with the shutter carrying element to move the same backwardly and forwardly when the rack is actuated, without impairing the rotation of the element by the rotating action of the shaft and a projection on the element and extending into the spiral groove to insure an independent rotation of the element when the rack is actuated.

3. In combination with a motion picture apparatus including a driving shaft, a spirally grooved sleeve mounted to rotate with said shaft, a shutter carrying element mounted loosely on the sleeve, a projection on the element and extending into the spiral groove, a pivoted yoke connecting with the element to move the same forwardly or backwardly when the yoke is moved, independently of the rotation of the sleeve by the action of the shaft and means connecting with the yoke to operate the same.

4. A motion picture shutter and operating device for a motion picture machine including a shutter driving shaft, comprising a bracket on the machine and having the shaft journaled therein, a supplementary bracket rigid with the first mentioned bracket, a sleeve on the driving shaft and rotatable therewith, said sleeve having a spiral groove, a shutter carrying element mounted on said sleeve, a projection on the element and extending into the groove whereby said element will be rotated with the sleeve and means for advancing or retreating the element upon the sleeve to follow the line of the spiral groove and thus impart an independent rotary movement to the element.

5. A motion picture shutter and operating device for a motion picture machine, including a shutter driving shaft, comprising a bracket on the machine with an end of the shaft projecting from an end of the bracket, a supplementary bracket secured to the first named bracket, a spirally grooved sleeve on the forward projecting end of the shaft, a shutter carrying element loosely mounted on said sleeve, a projection on the element and extending into the spiral groove of the sleeve, a U-shaped yoke in loose contact with said element, a rack mounted to slide on the supplementary bracket and having the yoke pivoted thereto, and a pinion journaled on the supplementary bracket and co-acting with the rack to actuate the same when said pinion is actuated.

In testimony whereof I affix my signature in presence of a witness.

JOHN J. HUGHES.

Witness:
AMY B. HORN.